(12) United States Patent
Ahmad (10) Patent No.: US 9,990,194 B2
(45) Date of Patent: Jun. 5, 2018

(54) PRESERVATION OF BACKWARD COMPATIBILITY FOR JAVA CARD CAP FILES

(71) Applicant: Oracle International Corporation, Redwood Shores, CA (US)

(72) Inventor: Saqib Ahmad, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 110 days.

(21) Appl. No.: 15/247,218

(22) Filed: Aug. 25, 2016

(65) Prior Publication Data

US 2018/0060043 A1 Mar. 1, 2018

(51) Int. Cl.
*G06F 9/44* (2018.01)

(52) U.S. Cl.
CPC ............... *G06F 8/71* (2013.01); *G06F 8/315* (2013.01)

(58) Field of Classification Search
CPC ......... G06F 8/315; G06F 8/71; G06F 9/44589
USPC .......................................... 717/118, 120–123
See application file for complete search history.

(56) References Cited

U.S. PATENT DOCUMENTS

| 6,880,084 | B1 * | 4/2005 | Brittenham | G06F 21/77 705/66 |
| 2005/0184163 | A1 * | 8/2005 | de Jong | G06Q 20/341 235/492 |
| 2005/0184164 | A1 * | 8/2005 | de Jong | G06Q 20/341 235/492 |
| 2005/0184165 | A1 * | 8/2005 | de Jong | G06Q 20/341 235/492 |
| 2005/0188360 | A1 * | 8/2005 | de Jong | G06Q 20/341 717/136 |
| 2006/0004810 | A1 * | 1/2006 | Atkin | G06F 8/53 |
| 2009/0290704 | A1 * | 11/2009 | Cimino | G06Q 20/3552 380/28 |
| 2010/0077392 | A1 * | 3/2010 | Soh | G06Q 20/341 717/174 |

OTHER PUBLICATIONS

"Java Card™ 2.2 Runtime Environment (JCRE) Specification," Jun. 2002, Sun Microsystems Inc., p. 1-110.*

* cited by examiner

*Primary Examiner* — Qing Chen
(74) *Attorney, Agent, or Firm* — Fish IP Law, LLP (57) ABSTRACT

A method for preserving backward compatibility involves adding a new virtual method to a first version of a code package comprising a plurality of members to obtain a second version of the code package, wherein the plurality of members include a plurality of virtual methods having at least a first virtual method that is assigned a first token number and a second virtual method that is assigned a second token number sequentially after the first token number, converting a set of code that is part of the first version of the code package to obtain a converted file, modifying the converted file to include backward compatibility information associated with a plurality of token numbers assigned to the plurality of virtual methods in the first version of the code package, and adjusting the assigned first and second token numbers at one of linking time and runtime based on the backward compatibility information.

20 Claims, 6 Drawing Sheets

PRESERVATION OF BACKWARD COMPATIBILITY FOR JAVA CARD CAP FILES

BACKGROUND

According to the Java Card specification, if a public non-final library or API class is to be kept backward compatible, there can be no public virtual methods added to the public non-final library or API class. Same is the case with the public interfaces. This is because the class and interface method linking is based on tokens which are assigned when a CAP file is created by a converter. The same token numbers are relied upon for on-card linking and runtime method resolution.

SUMMARY

In general, in one embodiment, the disclosure relates to a method for preserving backward compatibility, comprising adding a new virtual method to a first version of a code package comprising a plurality of members to obtain a second version of the code package, wherein the plurality of members include a plurality of virtual methods having at least a first virtual method that is assigned a first token number and a second virtual method that is assigned a second token number sequentially after the first token number, converting a set of code that is part of the first version of the code package to obtain a converted file comprising a binary representation of the plurality of members, the converted file being standardized for verifying/loading onto a card computing device, modifying the converted file to include backward compatibility information associated with a plurality of token numbers assigned to the plurality of virtual methods in the first version of the code package, adjusting the assigned first and second token numbers at one of linking time and runtime based on the backward compatibility information stored in the converted file so that the second version of the code package is compatible with the first version of the code package.

In general, in one embodiment, the disclosure relates to a system, comprising a computer processor and memory, a first version of a code package stored in the memory and comprising a set of code with a plurality of members, the plurality of members having a plurality of methods including a first virtual method that is assigned a first token number, and a second virtual method that is assigned a second token number, wherein the second token number is sequentially after the first token number; and a backward compatibility preservation mechanism operatively connected to the memory, wherein the backward compatibility preservation mechanism executes on the computer processor and is configured to add a new virtual method to the first version of the code package sequentially after the first virtual method and before the second virtual method to obtain a second version of the code package, convert a set of code that is part of the first version of the code package to obtain a converted file comprising a binary representation of the plurality of members, the converted file being standardized for verifying/loading onto a card computing device, modify the converted file to include backward compatibility information associated with a plurality of token numbers assigned to the plurality of virtual methods in the first version of the code package, and adjust the assigned first and second token numbers at one of linking time and runtime based on the backward compatibility information stored in the converted file so that the second version of the code package is compatible with the first version of the code package.

In general, in one embodiment, the disclosure relates to a non-transitory computer readable medium comprising instructions that, when executed by a computer processor, perform a method comprising adding a new virtual method to a first version of a code package comprising a plurality of members to obtain a second version of the code package, wherein the plurality of members include a plurality of virtual methods having at least a first virtual method that is assigned a first token number and a second virtual method that is assigned a second token number sequentially after the first token number, converting a set of code that is part of the first version of the code package to obtain a converted file comprising a binary representation of the plurality of members, the converted file being standardized for verifying/loading onto a card computing device, modifying the converted file to include backward compatibility information associated with a plurality of token numbers assigned to the plurality of virtual methods in the first version of the code package, and adjusting the assigned first and second token numbers at one of linking time and runtime based on the backward compatibility information stored in the converted file so that the second version of the code package is compatible with the first version of the code package.

Other aspects of the disclosure will be apparent from the following description and the appended claims.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments disclosed herein relate to a mechanism for preserving backward compatibility for a Java code package. Specifically, one or more embodiments enable maintaining backward compatibility of a code package even after adding public virtual methods to a non-final class of the package. More specifically, in one or more embodiments, additional backward compatibility information is obtained after virtual methods are added to a package, and the token numbers of the virtual methods are adjusted based on the backward compatibility information so that the new version of the package is compatible with the first version of the package.

Figure 1:
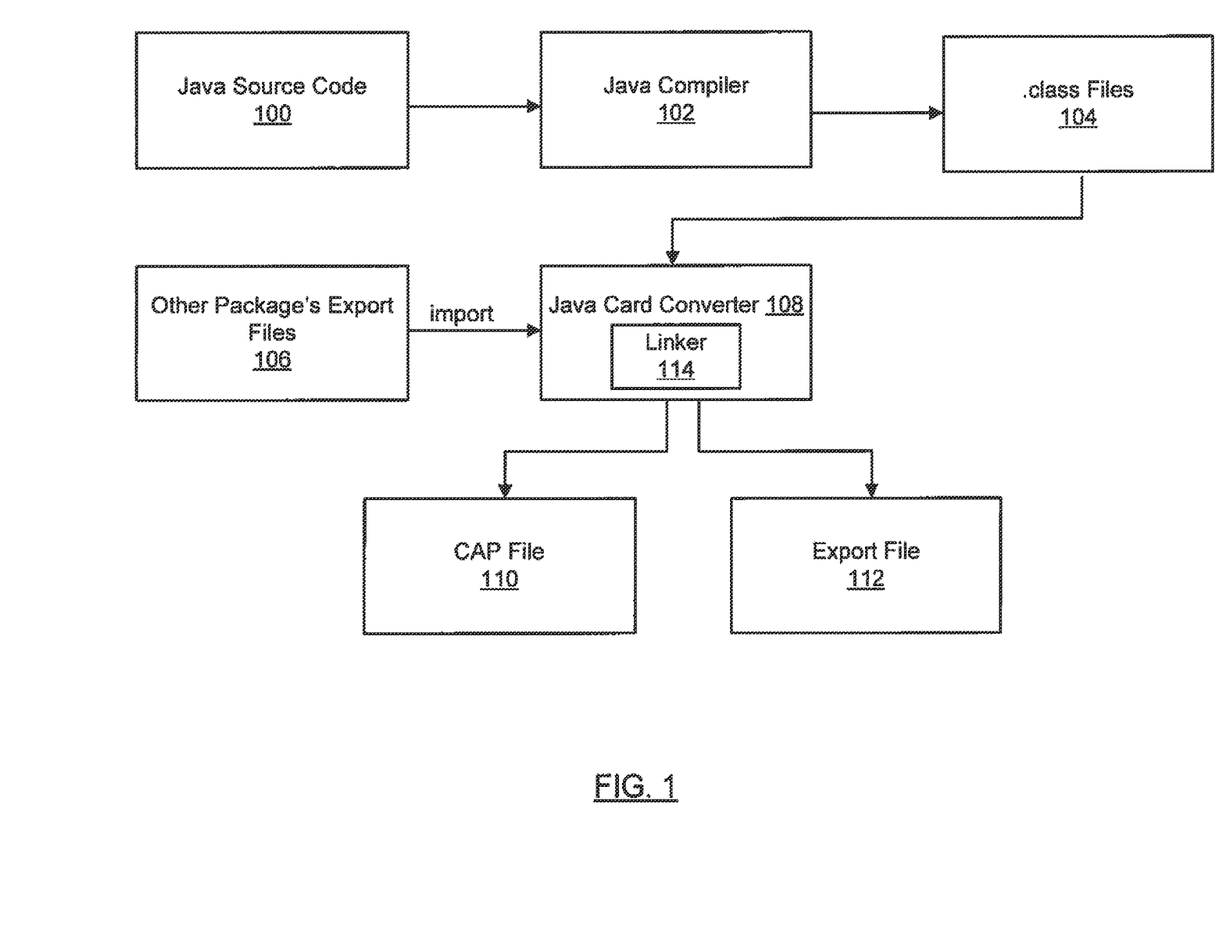
FIG. 1 shows primary components of Java card development steps in accordance with one or more embodiments.

FIG. 1 shows primary components of Java card development steps in accordance with one or more embodiments. Specifically, FIG. 1 shows a flow diagram of the development aspects of Java Card applets, i.e., the components and steps involved when developing a Java Card application for a Java Card (e.g., a SIM card, or any other suitable card computing device). The first step to develop a Java card application is writing Java source code (100) (i.e., .java files) according to specific functions of the application. The Java source code (100) is organized as a Java package and is sent to a Java compiler (102) to be compiled to .class files (104).

In one or more embodiments disclosed herein, a compiler is a computer program or set of programs designed to transform source code (e.g., Java source code (100)) written in one or more programming languages, or intermediate representations (IRs) of a program, into machine code that is capable of being executed (e.g., via a processor). For example, a compiler may include functionality to create machine code that improves the execution speed, reduces memory footprint, optimizes loop execution, optimizes object handling, etc. of the program via any type of compiler optimization. In one or more embodiments disclosed herein, the compiler includes functionality to perform compilation of operations or functions as the program is executing (e.g., just-in-time (JIT) compilation).

In one or more embodiments, the Java code package is a set of code with a plurality of members, which include a plurality of virtual methods. The code package may be a public non-final library and an API classes, including classes and interfaces.

Continuing with FIG. 1, before the Java .class files may be loaded into a Java card device, they must be converted to a converted applet (CAP) file by a Java card converter (108). At this stage of the process, the Java Card Virtual Machine (JCVM) is split into an off-card JVM and an on-card JVM. This split moves expensive operations off-card and allows for a small memory footprint on the card itself, but it results in extra steps when developing Java Card applications. Conversion by the Java Card converter (108) may be an off-card operation. The converter (108) may output a CAP file (110), a Java card assembly file (not shown), and an export file (112). Another input to the Java card converter (108) may be other packages' export files, which provide information about packages that are imported (referenced) by a current package. These packages may also be loaded into the Java card device. More information regarding importing packages is provided in FIG. 2.

In one or more embodiments, during the process of converting a package by the Java card converter (108), a linker (114) may used to perform on-card linking and adjust a token base and token numbers of virtual methods. A linker is a program or set of programs used with a compiler or assembler to provide links to the libraries needed for an executable program. The linker (114) may take one or more object files generated by the compiler (102) and combine them into one, executable program that links the various object files together.

The CAP file (110) is the file installed in a Java card device, which contains the executable binary representation of the classes and interfaces in a Java code package. The CAP file (110) includes a class component and an export component. In one or more embodiments, the export component of the CAP file (110) is configured to store backward compatibility information for reconciling two version of the code package. The class component of the CAP file contains the classes associated with the CAP file and a virtual method table. The CAP file (110) also contains a manifest file that provides human-readable information regarding the package that the CAP file represents. The CAP file is standardized for verifying/loading onto a device.

The export file (112) contains the public API linking information of classes in an entire package. The Unicode string names of the classes, methods and fields are assigned unique numeric tokens. During the conversion, when the code in the currently-converted package references a second package, the converter (108) loads the export file of the second package. Information in this export file of the second package is included in the current CAP file (110), then is used on the Java card device to link the contents of the current package to items imported from the second package. This process is done by the linker (114) in the Java card converter (108).

Before a converted CAP file is loaded onto a Java card device, the Cap file may be verified. Verification is an optional process to validate the CAP file for structure, valid bytecode subset, and inter-package dependencies. For example, verification may be performed on third-party vendor packages, or when the converter tool comes from a third-party vendor. Verification is typically an off-card operation, but some card products may include an on-board verifier.

In a Java card system, the virtual methods are assigned unique consecutive token numbers starting from the base class. When token numbers are changed in the base class, such changes affect the token numbers of the subclasses which may be in other code packages. Tokens are used to resolve references to imported elements of a package. Embodiments described herein provide a mechanism whereby it is possible to determine the base and count of virtual method tokens of the previously compatible versions of the code package in order to update the token assignments for a new version. This backward compatibility information is made available in both the CAP file (110) and the export file (112) for propagation during the Java card development process as shown in FIG. 1. Specifically, the backward compatibility information is stored for every class in the export component of the CAP file and every class in the export file of a code package.

Further details on the backward compatibility information are provided below in FIG. 2.

Figure 2:
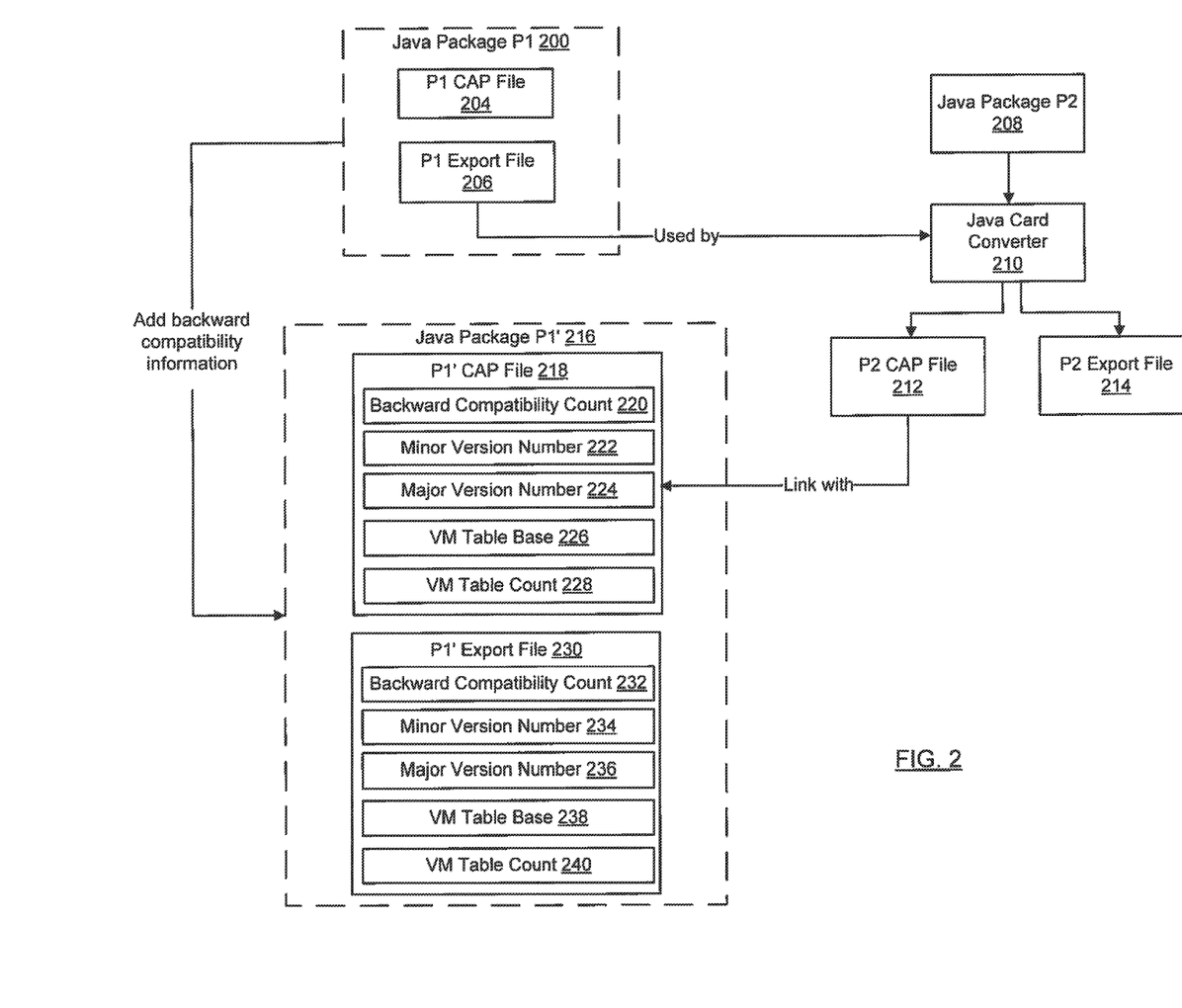
FIG. 2 shows a schematic diagram of binary compatibility in accordance with one or more embodiments.

FIG. 2 shows a flow diagram of binary compatibility for multiple Java code packages in accordance with one or more embodiments. In a Java card system, Java package P1 (200) is converted to create P1 CAP file (204) and P1 export file (206). Package P2 (208) imports package P1 (200). Accordingly, when the P2 package (208) is converted by Java card converter (210), the export file of P1 (206) is taken as an input to the converter.

In one embodiment, the package P1 is modified to package P1' (216) in the following ways: i) an externally visible virtual method that does not override a preexisting method is added to a non-final public class; and/or ii) an externally visible interface method that does not override a preexisting method is added to a public interface. Package P1' (216) is converted to produce P1' CAP file (218) and P1' export file (230).

After such modification, token numbers may have been modified, which may result in binary incompatibility. Specifically, in one or more embodiments, token numbers are assigned to virtual methods in a class in sequential order. The token number assignments and virtual class methods are kept track of in a virtual method table. The virtual method table in a class component contains tokens for an the virtual methods in the class hierarchy (including super class but not sub-classes). The virtual method table base indicates the token number from which the methods defined in the corresponding class start. The virtual method table is stored as part of the Class_info structure for every class in the class component of the CAP file.

To reconcile the mismatch of token assignments when one or more new virtual methods are added to a class, backward compatibility information is added into the P1 CAP file (204) and P1 export file (206) to get P1' CAP file (218) and P1' export file (230) in accordance with one or more embodiments. The P2 CAP file (212) converted using the P1 export file (206) can link with the new P1' CAP file (218). In other words, the new P1 CAP file (218) is binary compatible with the preexisting P1 CAP file (204) by the modification of adding backward compatibility information.

More specifically, in one or more embodiments, the process of adding backward compatibility information to obtain the P1' CAP file/P1' export file includes modifying the information contained in the export component of the CAP file to include a backward compatibility count (220, 232) and backward compatibility info. The backward compatibility info includes four pieces of data: a minor version number (222, 234), a major version number (224, 236), a virtual method table base (226, 238), and a virtual method count (228, 240).

Specifically, the backward compatibility count (220, 232) is separate from the rest of the set (i.e., the backward compatibility info), which repeats the number of times equal to the backward compatibility count. In other words, the backward compatibility count (220, 232) is a value that represents the number of times the backward compatibility info repeats. That is, ul backward_compatibility_count
backward_compatibility_info[backward_compatibility_$count$]

Further, each implementation of a package in a Java card system is assigned a pair of major (224, 236) and minor version numbers (222, 234). These version numbers are used to indicate binary compatibility or incompatibility between successive implementations of a package. The major and minor versions of a package are assigned by the package provider. The initial implementation of a package may be assigned a major version of 1 and a minor version of 0. However, any suitable values may be chosen. When either a major or a minor version is incremented, it is incremented exactly by 1. However, again, any suitable increment may be employed.

A major version must be changed when a new implementation of a package is not binary compatible with the previous implementation. The value of the new major version must be greater than the major version of the previous implementation. When a major version is changed, the associated minor version must be assigned the value of 0.

When a new implementation of a package is binary compatible with the previous implementation, it must be assigned a major version equal to the major version of the previous implementation. The minor version assigned to the new implementation must be greater than the minor version of the previous implementation.

As described above, the virtual method table is a data structure that stores the virtual methods and their token numbers. The virtual method table base (226, 238) indicates the token number from which the methods defined in the corresponding class start, and the virtual method table count (228, 240) is information indicating the number of virtual methods that are stored in the table.

Accordingly, backward compatibility info may be represented as follows:

```
backward_compatbility_info is:
backward_compatibility_info{
u1 minor
u1 major
u2 public_virtual_method_table_base
u2 public_virtual_method_table_count
}
```

Where minor and major are the version numbers are previous version numbers of the package.

Completing the discussion of FIG. 2, when the Java package P1' (216) is created by adding the backward compatibility information, this package version (216) is linked by the linker with the P2 CAP file (212) and the P2 Export File (214) to obtain the new package P2 which is backward compatible with the updated package P1'.

An example illustrating the discussion of FIG. 2 above follows. In this example, Base Class A is part of a library package with the following entries in the export component:

```
backward_compatibility_info{
minor 0
major 1
public_virtual_method_table_base 1
public_virtual_method_table_count 3
}
backward_compatibility_info{
minor 1
major 1
public_virtual_method_table_base 3 // a super class added to the
heirarchy
public_virtual_method_table_count 5 // two new methods added to this
class
}
backward_compatibility_info{
minor 2
major 1
public_virtual_method_table_base 3 // no change
public_virtual_method_table_count 5 // no change
}
```

In the above example, version 1.0 of the library package for base class A starts at token assignment value 1 and has 3 public virtual methods. Version 1.1 starts at token assignment number 3 and has 5 virtual methods. Thus, two new methods were added in version 1.1. In version 1.2, there is no change from version 1.1.

Using the above backward compatibility info stored in the export component of a Java CAP file for base class A, suppose that library package version 1.2 is on the Java card device, and a second package, linked against version 1.0 is being downloaded on the card. During linking, a Class B is found which inherits from Class A. In this scenario, the linker determines that the package being downloaded was converted against version 1.0 and determines the difference in the table base and table count between versions 1.0 and 1.2 of class A in the library package. In this example, the difference in the table base is +2, because the table base in version 1.0 is 1 and the table base in version 1.2 is 3. Thus, in version 1.2, the token assignments begin at a value of 3 and are assigned sequentially thereafter. Further, the difference in the table count is also +2, as the table count in version 1.0 is 3 and in version 1.2 is 5. The linker then adjusts the table base and table count for class B using the difference determined in the previous step, and also adjusts token numbers of methods of class B accordingly, using the same information. Thus, in one or more embodiments, the converter must preserve token numbers between two version numbers of a CAP file.

Using the same backward compatibility information in the export component for base class A, now suppose in a second scenario that library package version 1.1 is loaded onto the Java card device, and second package, linked against version 1.2 is being downloaded on the card. In this case, the download fails, because the library package must be updated to version 1.2 before downloading any CAP files converted against version 1.2, That is, the backward compatibility information must be updated to reflect changes between version 1.1 and 1.2, even though in this scenario, there are no changes to the table base and table count.

Figure 3:
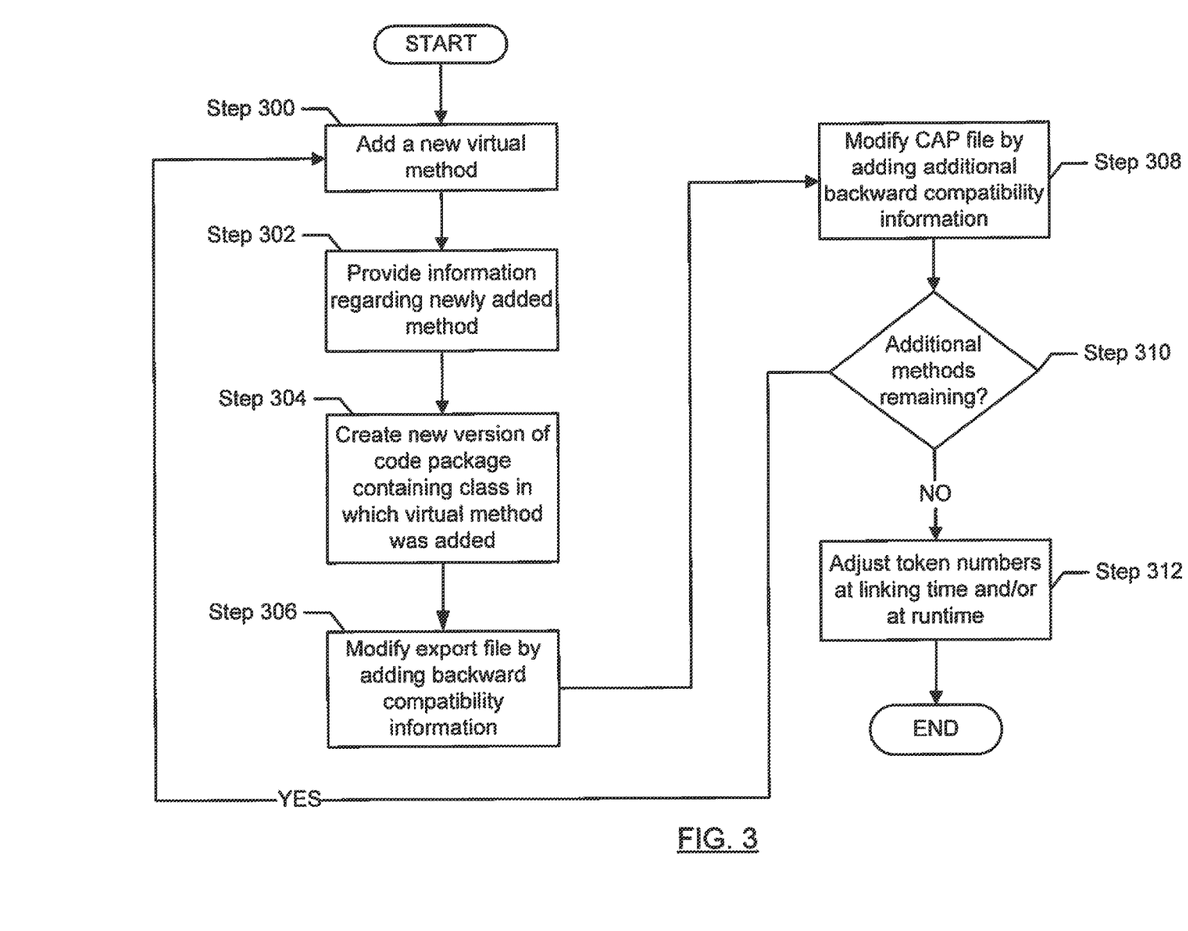
FIG. 3 shows a flowchart in accordance with one or more embodiments.

FIG. 3 shows a flowchart in accordance with one or more embodiments disclosed herein. While the various steps in the flowchart are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may be performed by performing a test, such as checking a data value to test whether the value is consistent with the tested condition in accordance with one or more embodiments.

In step 300, a new virtual method is added to a code package. As described above, a code package may be a public non-final library, API class, or any other suitable data structure or set of code within a code package. In one embodiment, the virtual method may be any method that may affect the token number of subclasses within the same class hierarchy. Those skilled in the art will appreciate that embodiments disclosed herein are not limited to the addition of virtual methods. For example, embodiments disclosed herein may apply to adding a new public class or one or more fields within a class without departing from the scope of this disclosure.

In step 302, information regarding the newly added method is provided, including the type of method added, where the method is added, and major and minor version numbers of the previous package. When a new version of a package is created (step 304), the converter automatically determines the delta between the new version and the previous version. The delta may be, in one or more embodiments, the difference in the table base value and the table count value of the virtual method table stored for each class in the package. Such information is kept not just between two versions, but from the base version up to any number of versions. Therefore, no matter what version a device's existing package is, the information delta between the existing package and the newest package may be readily determined.

In step 306, the export file is modified by adding backward compatibility information associated with the new package version. In one embodiment, the export file is modified to reflect the changes introduced by the adding of the new method (i.e., the delta determined in step 304). In one or more embodiments, the export file is modified to include the major number of the package version, the minor number of the package version, the table base and the table count.

In step 308, the CAP file is modified by augmenting the export component of the CAP file to include the same backward compatibility information added to the export file in step 306. Because the CAP file contains the executable binary representation of the classes and interfaces of the whole package, the executable binary representation of the newly added method is also included. In addition, the token number changes are reflected to ensure each method is able to be called and imported correctly.

In step 310, a decision is made about whether there are any remaining methods to be added across the classes in the package. If there are remaining methods that have not been added, the process returns to step 300; otherwise, all the methods have been added, and the process proceeds to step 312.

In step 312, token number assignments are adjusted. In one or more embodiments, this adjustment may be performed at linking time or at runtime. Specifically, in one or more embodiments, the token numbers assigned at conversion time are adjusted at linking time and for runtime using the backward compatibility information stored in the CAP file for each class. The adjustment process gives each newly added method a token number, and further changes the token numbers of existing methods introduced in subclasses. Thus, no two virtual methods have the same unique token number assignment after the token numbers are re-numbered sequentially to account for the new virtual methods added to the classes. The adjustment process ensures that all the methods have a unique token number that can be used to import and link the method without any incompatibility.

Figure 4:
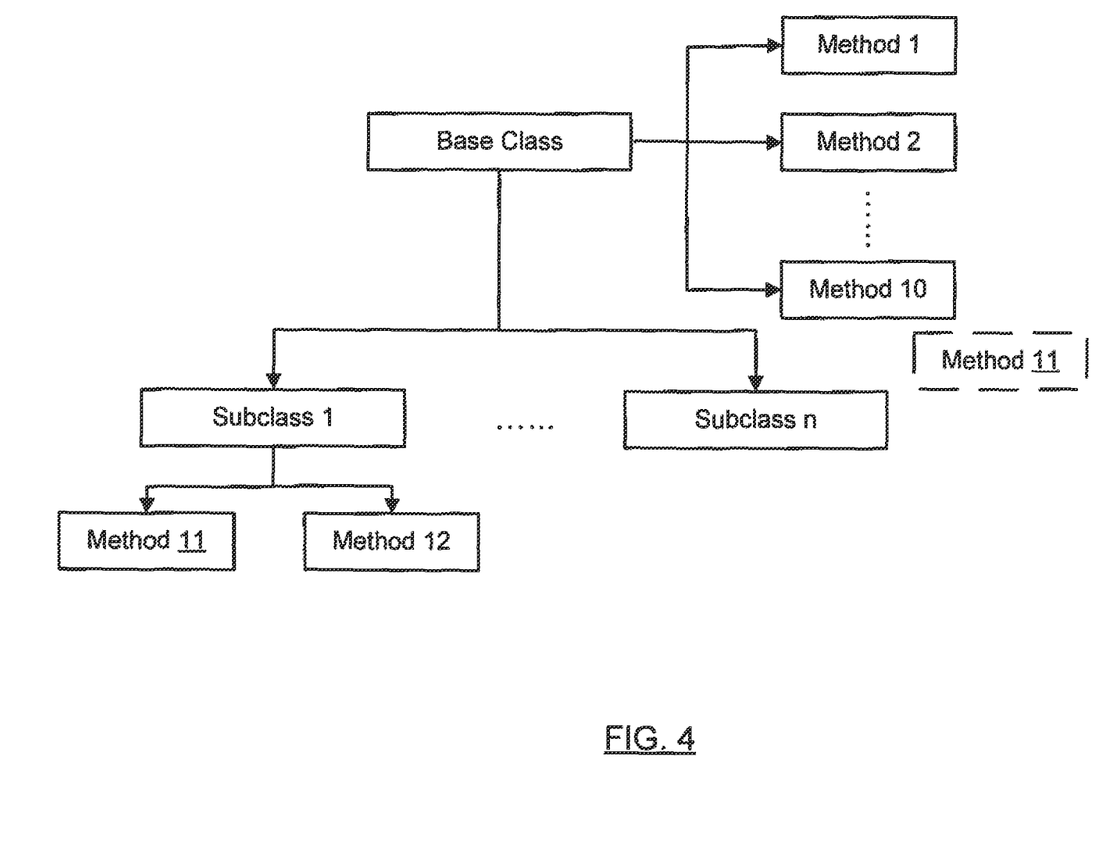
FIG. 4 shows an example of incompatibility in accordance with one or more embodiments.

FIG. 4 shows an example of incompatibility in accordance with one or more embodiments disclosed herein. As described above, tokens assigned to public and protected virtual methods are scoped to the hierarchy of a class. Tokens assigned to public and protected virtual methods introduced in a subclass have values starting at one greater than the maximum token value assigned in a base class. As shown in FIG. 4, a base class has ten methods with token numbers from 1 to 10. There are n subclasses inherited from the base class. The first subclass introduces two methods. According to the token assignment rule, the two methods of subclass 1 have token numbers 11 and 12.

If a new, non-override, public or protected virtual method is introduced in the base class, it is assigned a token value that would otherwise have been assigned in a subclass. As shown in FIG. 4, if a new method is introduced, it would be assigned token number 11. However, the first method of subclass 1 has a method with token number 11.

Figure 5:
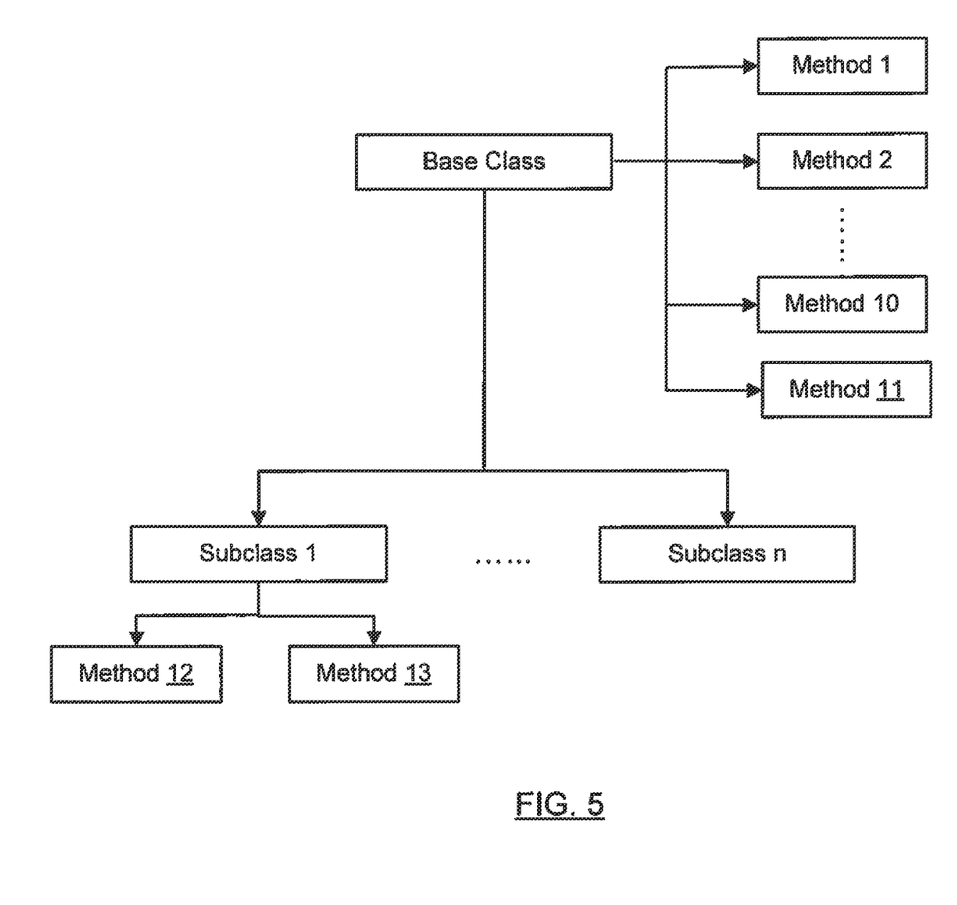
FIG. 5 shows an example of compatibility in accordance with one or more embodiments.

FIG. 5 shows an example of compatibility in accordance with one or more embodiments disclosed herein. Turing to the incompatibility example in FIG. 4, if a new method is added, its token number may conflict with the existing token number of subclass 1's first method. After the token adjusting process of FIG. 3, the new method can be added and assigned a token number 11. To avoid the aforementioned collision, the token numbers of subclass 1's two methods are adjusted to be 12 and 13. The token methods of other subclasses (i.e. subclass 2, . . . subclass n) will be adjusted accordingly. Therefore, every method has a unique token number after the adjusting. Further, preservation of backward compatibility is achieved in a Java card system. The aforementioned examples are not intended to limit the scope of the disclosure.

Figure 6:
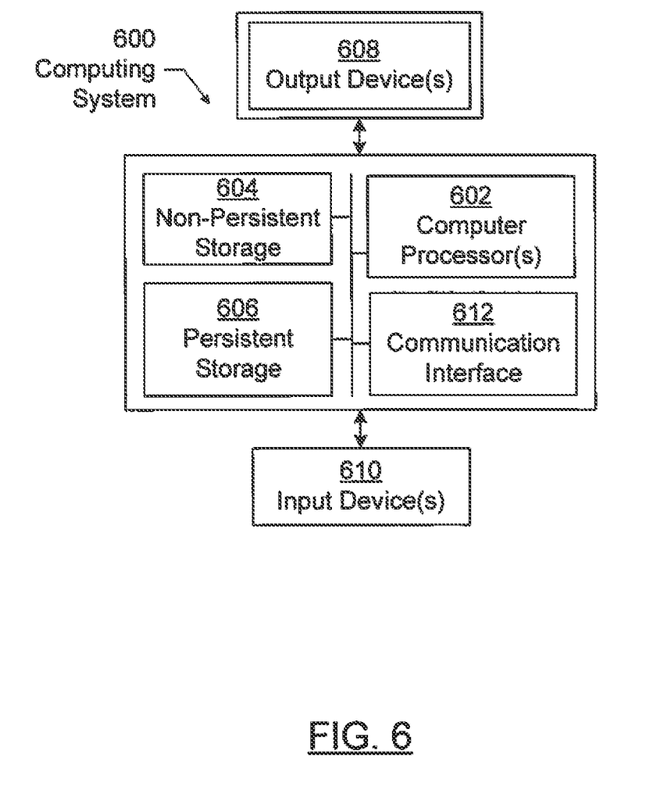
FIG. 6 shows a computing system in accordance with one or more embodiments.

Embodiments disclosed herein may be implemented on a computing system. Any combination of mobile, desktop, server, router, switch, embedded device, or other types of hardware may be used. For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

While the disclosure has been described with respect to a limited number of embodiments, those skilled in the art, having benefit of this disclosure, will appreciate that other embodiments can be devised which do not depart from the scope of the disclosure as described herein. Accordingly, the scope of the disclosure should be limited only by the attached claims.

What is claimed is:

1. A method for preserving backward compatibility, comprising:
adding, by one or more computer processors, a new virtual method to a first version of a code package comprising a plurality of members to obtain a second version of the code package,
wherein the plurality of members include a plurality of virtual methods having at least a first virtual method that is assigned a first token number and a second virtual method that is assigned a second token number sequentially after the first token number;
converting, by the one or more computer processors, a set of code that is part of the first version of the code package to obtain a converted file comprising a binary representation of the plurality of members, wherein the converted file is standardized for verifying/loading onto a card computing device;
modifying, by the one or more computer processors, the converted file to include backward compatibility information associated with a plurality of token numbers assigned to the plurality of virtual methods in the first version of the code package; and
adjusting, by the one or more computer processors, the assigned first and second token numbers at one of linking time and runtime based on the backward compatibility information stored in the converted file so that the second version of the code package is compatible with the first version of the code package.

2. The method of claim 1, wherein the new virtual method is added sequentially after the first virtual method and before the second virtual method, and wherein adjusting the assigned first and second token numbers comprises:
assigning the first token number to the first virtual method;
assigning a third token number sequentially after the second token number to the second virtual method; and
assigning the second token number to the new virtual method.

3. The method of claim 2, wherein the first and second token numbers are assigned to the first and second virtual methods, respectively, at conversion time, and wherein the first, second, and third token numbers are assigned to the first, new, and second virtual methods, respectively, at runtime.

4. The method of claim 1, wherein the backward compatibility information comprises:
a major version number of the code package,
a minor version number of the code package,
a virtual method table base value, and
a virtual method table count value,
wherein the virtual method table base value comprises an initial token assignment number beginning at which the plurality of token numbers are assigned in a corresponding class, and the virtual method table count value comprises a number of virtual methods in the corresponding class.

5. The method of claim 4, wherein the virtual method table base value and the virtual method table count value are stored in a virtual method table in a class component of the converted file.

6. The method of claim 1, further comprising:
modifying an export component of the converted file to include the backward compatibility information; and
storing a copy of the backward compatibility information in an export file.

7. The method of claim 1, further comprising:
at linking time, the backward compatibility information is used, by a linker for performing on-card linking, to adjust a token base and the plurality of token numbers of the plurality of virtual methods in a corresponding class.

8. The method of claim 1, wherein the code package is one selected from a group consisting of a public non-final library and an API class.

9. The method of claim 1, wherein the plurality of members of the code package further comprises classes and interfaces.

10. A system, comprising:
one or more computer processors and a memory;
a first version of a code package stored in the memory and comprising a set of code with a plurality of members, wherein the plurality of members includes a plurality of methods including:
  a first virtual method that is assigned a first token number; and
  a second virtual method that is assigned a second token number,
  wherein the second token number is sequentially after the first token number; and
a backward compatibility preservation mechanism operatively connected to the memory, wherein the backward compatibility preservation mechanism executes on the one or more computer processors and is configured to:
  add a new virtual method to the first version of the code package sequentially after the first virtual method and before the second virtual method to obtain a second version of the code package;
  convert a set of code that is part of the first version of the code package to obtain a converted file comprising a binary representation of the plurality of members, wherein the converted file is standardized for verifying/loading onto a card computing device;
  modify the converted file to include backward compatibility information associated with a plurality of token numbers assigned to a plurality of virtual methods in the first version of the code package; and
  adjust the assigned first and second token numbers at one of linking time and runtime based on the backward compatibility information stored in the converted file so that the second version of the code package is compatible with the first version of the code package.

11. The system of claim 10, wherein the new virtual method is added sequentially after the first virtual method and before the second virtual method, and wherein adjusting the assigned first and second token numbers comprises:
  assigning the first token number to the first virtual method;
  assigning a third token number sequentially after the second token number to the second virtual method; and
  assigning the second token number to the new virtual method.

12. The system of claim 11, wherein the first and second token numbers are assigned to the first and second virtual methods, respectively, at conversion time, and wherein the first, second, and third token numbers are assigned to the first, new, and second virtual methods, respectively, at runtime.

13. The system of claim 10, wherein the backward compatibility information comprises:
  a first previous version number of the code package,
  a second previous version number of the code package,
  a public virtual method table base value, and
  a public virtual method table count value,
  wherein the public virtual method table base value comprises an initial token assignment number beginning at which the plurality of token numbers are assigned in a corresponding class, and the public virtual method table count value comprises a number of virtual methods in the corresponding class.

14. The system of claim 10, wherein the backward compatibility preservation mechanism is further configured to:
  modify an export component of the converted file to include the backward compatibility information; and
  store a copy of the backward compatibility information in an export file.

15. The system of claim 10, wherein the backward compatibility preservation mechanism is further configured to:
  adjust a token base and a plurality of token numbers of the plurality of virtual methods at linking time, by a linker configured to perform on-card linking, using the backward compatibility information.

16. The system of claim 10, wherein the code package is one selected from a group consisting of a public non-final library and an API class.

17. The system of claim 10, wherein the plurality of members of the code package further comprises classes and interfaces.

18. A non-transitory computer readable medium storing instructions that, when executed by one or more computer processors, perform a method comprising:
  adding a new virtual method to a first version of a code package comprising a plurality of members to obtain a second version of the code package,
  wherein the plurality of members include a plurality of virtual methods having at least a first virtual method that is assigned a first token number and a second virtual method that is assigned a second token number sequentially after the first token number;
  converting a set of code that is part of the first version of the code package to obtain a converted file comprising a binary representation of the plurality of members, wherein the converted file is standardized for verifying/loading onto a card computing device;
  modifying the converted file to include backward compatibility information associated with a plurality of token numbers assigned to the plurality of virtual methods in the first version of the code package; and
  adjusting the assigned first and second token numbers at one of linking time and runtime based on the backward compatibility information stored in the converted file so that the second version of the code package is compatible with the first version of the code package.

19. The non-transitory computer readable medium of claim 18, wherein the new virtual method is added sequentially after the first virtual method and before the second virtual method, and wherein adjusting the assigned first and second token numbers comprises:
  assigning the first token number to the first virtual method;
  assigning a third token number sequentially after the second token number to the second virtual method; and
  assigning the second token number to the new virtual method.

20. The non-transitory computer readable medium of claim 18, wherein the backward compatibility information comprises:
  a first previous version number of the code package,
  a second previous version number of the code package,
  a public virtual method table base value, and
  a public virtual method table count value,
  wherein the public virtual method table base value comprises an initial token assignment number beginning at which the plurality of token numbers are assigned in a corresponding class, and the public virtual method table count value comprises a number of virtual methods in the corresponding class.

* * * * *

UNITED STATES PATENT AND TRADEMARK OFFICE
CERTIFICATE OF CORRECTION

PATENT NO. : 9,990,194 B2  
APPLICATION NO. : 15/247218  
DATED : June 5, 2018  
INVENTOR(S) : Ahmad Page 1 of 1

It is certified that error appears in the above-identified patent and that said Letters Patent is hereby corrected as shown below:

In the Specification

In Column 2, Line 32, delete "Java" and insert -- java --, therefor.

In Column 3, Line 65, after "may" insert -- be --.

In Column 5, Line 15, delete "an" and insert -- all --, therefor.

In Column 5, Line 51, delete "compatibility_$_{count}$]" and insert -- compatibility_count] --, therefor.

In Column 6, Line 21, delete "compatbility" and insert -- compatibility --, therefor.

In Column 6, Line 22, delete "compatbility" and insert -- compatibility --, therefor.

In Column 6, Line 48, delete "heirarchy" and insert -- hierarchy --, therefor.

In Column 7, Line 27, delete "1.2," and insert -- 1.2. --, therefor.

In Column 8, Line 31, delete "and for" and insert -- and/or --, therefor.

Signed and Sealed this  
Fourteenth Day of May, 2019

Andrei Iancu  
*Director of the United States Patent and Trademark Office*